United States Patent [19]

Garrison

[11] Patent Number: 5,595,403
[45] Date of Patent: Jan. 21, 1997

[54] CARD INTERMEDIATE AND METHOD

[75] Inventor: Ronald R. Garrison, Batavia, Ill.

[73] Assignee: Wallace Computer Services, Inc., Hillside, Ill.

[21] Appl. No.: 285,410

[22] Filed: Aug. 3, 1994

Related U.S. Application Data

[63] Continuation-in-part of Ser. No. 159,294, Nov. 30, 1993, abandoned, and Ser. No. 198,612, Feb. 18, 1994, Pat. No. 5,466,013.

[51] Int. Cl.$^6$ ................................................ B42D 15/00
[52] U.S. Cl. ........................... 283/74; 283/105; 283/109
[58] Field of Search ................................. 283/62, 67, 74, 283/75, 105, 107, 108, 109, 904

[56] References Cited

U.S. PATENT DOCUMENTS

| | | |
|---|---|---|
| 2,255,019 | 9/1941 | Wolters et al. . |
| 3,166,186 | 1/1965 | Karn . |
| 3,996,679 | 12/1976 | Warneke . |
| 4,248,919 | 1/1981 | Davis . |
| 4,479,838 | 4/1985 | Dunsirn et al. . |
| 4,508,365 | 4/1985 | Hawes . |
| 4,523,825 | 6/1985 | Norris . |
| 4,544,590 | 10/1985 | Egan . |
| 4,662,971 | 5/1987 | Adams . |
| 4,742,854 | 5/1988 | Shishido . |
| 4,863,772 | 9/1989 | Cross . |
| 4,910,038 | 3/1990 | Jameson . |
| 4,925,716 | 5/1990 | Haas . |
| 4,986,868 | 1/1991 | Schmidt . |
| 5,042,842 | 8/1991 | Green et al. . |
| 5,129,682 | 7/1992 | Ashby . |
| 5,219,183 | 6/1993 | McKillip . |
| 5,318,326 | 6/1994 | Garrison . |
| 5,380,044 | 1/1995 | Aitkens et al. ............... 283/109 X |
| 5,466,013 | 11/1995 | Garrison ............................ 283/107 |

FOREIGN PATENT DOCUMENTS

| | | |
|---|---|---|
| 01214485 | 11/1989 | Japan . |
| 02285390 | 2/1990 | Japan . |
| 9011194 | 4/1990 | Japan . |
| 2121896 | 5/1990 | Japan . |
| 58025379 | 2/1993 | Japan . |
| 2209993 | 1/1989 | United Kingdom . |

*Primary Examiner*—Willmon Fridie, Jr.
*Attorney, Agent, or Firm*—Tilton, Fallon, Lungmus & Chestnut

[57] ABSTRACT

A card intermediate, as for identification, which includes a business form having one or more cards diecut into it and backed by a laminate of multi-ply film. An embodiment is illustrated where an exposed face of the laminate is reverse printed with alpha and/or numeric information so as to be readable when the card is removed from the form.

4 Claims, 1 Drawing Sheet

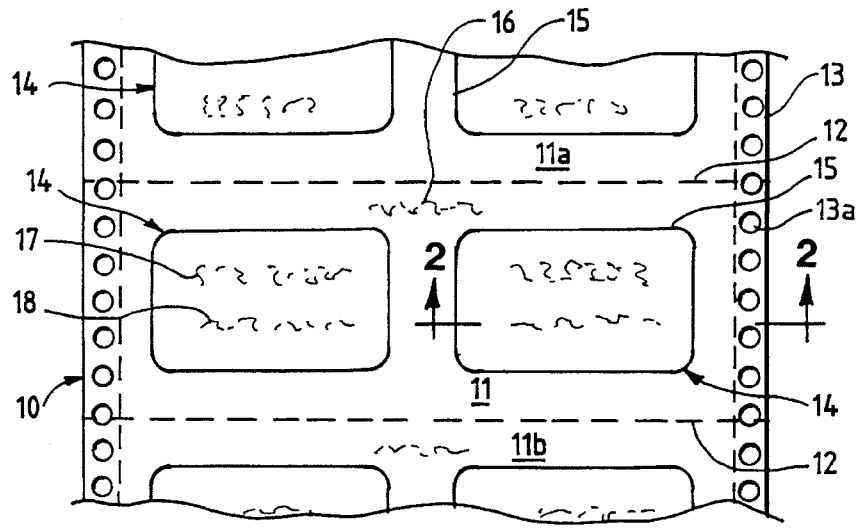
FIG. 1
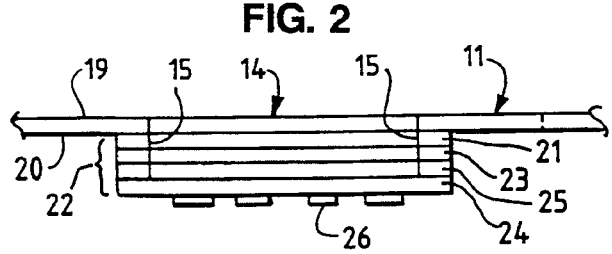
FIG. 2
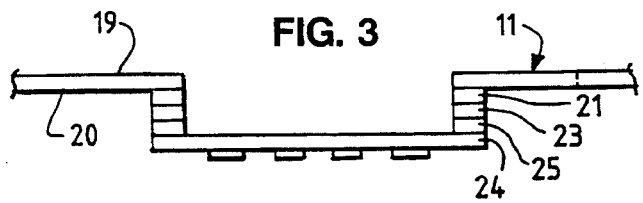
FIG. 3
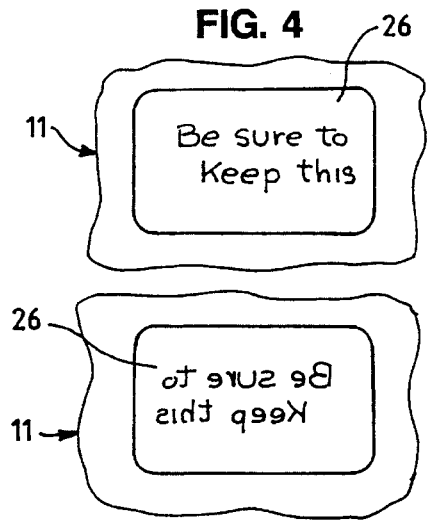
FIG. 4
FIG. 5
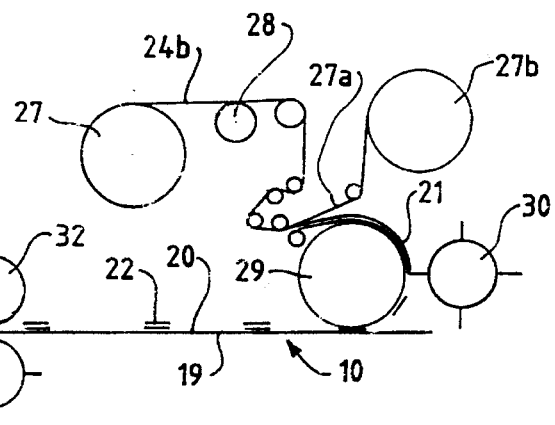
FIG. 6

5,595,403

CARD INTERMEDIATE AND METHOD

This application is a continuation-in-part of Ser. No. 08/159,294 filed Nov. 30, 1993, now abandoned and of Ser. No. 08/198,612 filed Feb. 18, 1994, now U.S. Pat. No. 5,466,013.

BACKGROUND AND SUMMARY OF INVENTION

This invention relates to a card intermediate and method and, more particularly to an intermediate which includes a two film ply laminate on a length of card-providing paper.

Currently, cards such as identification cards (I.D. cards), coupons, etc., are provided by the sponsoring company-story, insurance company, etc. These are provided as part of a business form and detachable therefrom by the intended user. These card-equipped forms are of two types. One type has the card "tipped on", i.e., adhesively secured to one surface. This has the disadvantage of developing a substantial thickness so that laser printing, for example, is virtually prohibited. The other type has a sheet perforated to define the card. Although this avoids the thickness problem, it substitutes another problem in the form of the perforation bonds which give the card a rough-feeling edge. Both problems are avoided by the invention.

According to the invention, a card intermediate is provided which includes a length of paper having top and bottom surfaces and a generally rectangular die cut extending therethrough between the surfaces to define the card. A film laminate is adhesively secured to the bottom surface and extends beyond the diecut on all sides thereof. The laminate includes two film layers adhesively united in superposed relation with a first of the film layers being positioned adjacent the bottom surface and a second of the film layers being positioned remote from the bottom surface. The diecut extends through the first film layer but not the second film layer. The paper length top surface within the diecut is advantageously equipped with printed indicia within the diecut. In the case of an I.D. card, a first printed indicia may relate to the sponsor of the I.D. card and a second printed indicia may relate to the identity of the intended user of the I.D. card.

In a specific advantageous embodiment, the laminate outer surface is also printed—and with a reverse image so that there will be information under the card when the user removes it. In such case, the second film layer is sufficiently transparent for the user to see through the second film layer and readily understand the reverse image which now appears as a sensible image, i.e., a proper alpha presentation when viewed from the side from which the I.D. card was removed. Printing on transparent liners is known—see U.S. Pat. No. 4,662,971—but not in reverse fashion as here.

The invention also includes a method for making a card intermediate which include the steps of providing a two ply film laminate arranged in face-to-face relation with a rupturable adhesive therebetween and also providing a length of paper having opposed surfaces with printed indicia on one of the surfaces. The steps further include adhesively uniting the laminate to the second of the surfaces to position a first of the film plies adjacent the second surface, diecutting the paper length and the first of the film plies to provide a generally rectangular closed perimeter cut defining a card, and imprinting printed indicia on the one surface. The imprinted indicia may relate to the identity of the intended user of the I.D. card. Thus, the invention provides advantages over the prior art both structurally and in the method of making. In the specific embodiment referred to above, the inventive method is especially advantageous in providing reverse printing on the exposed face of the laminate.

BRIEF DESCRIPTION OF DRAWING

The invention is described in conjunction with the accompanying drawing, in which—

FIG. 1 is a perspective view of a fragmentary string of form lengths constructed according to teachings of the invention;

FIG. 2 is an enlarged fragmentary cross sectional view taken along the sight line 2—2 as applied to FIG. 1;

FIG. 3 is a view similar to FIG. 2 but with the I.D. card removed;

FIG. 4 is a fragmentary top plan view of the product shown in FIG. 3;

FIG. 5 is a fragmentary bottom plan view of the product shown in FIG. 3; and

FIG. 6 is a schematic side elevational view of apparatus practicing the method of the invention.

DETAILED DESCRIPTION

Generally speaking, the invention makes use of a business form (either sheeted or continuous series with line holes) having one or more cards incorporated in each form length. An especially advantageous use of the invention is in connection with an I.D. card and, therefore, the ensuing description relates to such an embodiment.

Referring to FIG. 1, the numeral 10 designates generally a string of interconnected business form lengths as at 11, 11a, 11b, etc. Each form length is defined between transverse lines of perforation as at 12 and may be equipped, at least along one longitudinal side 13 with line holes as at 13a. The I.D. card is generally designated 14 and is defined by a closed perimeter or diecut 15 which includes a generally rectangular outline.

The form length 11 generally has two types of printed indicia thereon for an I.D. card. One type of printed indicia designated 16 has to do with the sponsor of the card and may also be present as at 17 in one portion of the I.D. card 14. The second type of printed indicia is designated 18 and relates to the intended user of the card—the I.D. information—and this is normally only on the card itself.

The construction according to the invention makes use of the form length 11 as seen in FIG. 2 and has a top surface 19 and a bottom surface 20. Applied to the bottom surface 20 is a pressure sensitive adhesive 21 which makes it possible to apply a laminate generally designated 22 to the bottom surface 20 of the form 11. The laminate 22 includes first and second transparent films as at 23 and 24 joined together by a dry adhesive 25. This adhesive is readily rupturable to separate the film plies. Such a laminate is commercially available from 3-Sigma located at Columbia, S.C. under Product No. 90906-546. Such a laminate has been used in the past in connection with coupon-bearing business forms but not of the card type described herein.

Also seen in FIG. 2 is the diecut 15 which is seen to extend from the top surface 19 of the form 11 down to but not through the bottom film 24. Thus, when the information on the intended user is applied to the card, the card is conveniently removed and has a rear film as at 23 to stiffen the same. In many instances, it is desirable to provide at least two I.D. cards and this version is depicted in FIG. 1.

The showing in FIG. 3 is of a portion of the form length with the I.D. card 14 removed. When viewed from below, the alpha and/or numeric character 26 is reversed—see FIG. 5, but when viewed from above they are sensible, i.e., normally readable—see FIG. 4. The second or bottom film 24 has upper and lower surfaces 24a, 24b with the characters 26 being printed on the lower surface 24b.

There are a number of advantages stemming from this construction including the card being made from the form so as to permit registration between the form and the I.D. card to be exact. Any type of paper can be used to produce the form such as 20 pound bond, 100 pound tag, etc.

As pointed out above, the back of the card has the film 23 laminated thereto so that this helps make the cards strong and durable. Since the form contains the card, the height difference between the form and the card is minimal—of the order of a mil or so (0.001") and this helps when the forms are in a pack and when running on a laser printer.

Inventive Method

In general, this makes use of a commercially available coupon stock applied in a patch on the back of the form using a pressure sensitive adhesive. The form is then diecut from the front or top side 19 over this patch. Thus, the patch extends beyond the diecut 15.

The diecut is continuous with no bonds in it and the shape of the diecut is that of a typical I.D. card—usually with rounded corners. The diecut goes through all the sheets of material down to the last or bottom ply 24 of the laminate 22. After the form is printed on any type printer, the I.D. card can be removed from the form.

The inventive method is shown in greater detail in FIG. 6 and reference is made thereto. Starting at the extreme right of FIG. 6, the numeral 10 again designates generally the length of paper which provides the form lengths 11, 11a, 11b, etc. and which also has surfaces 19 and 20. However, these surfaces are reversed from the showing in FIG. 2—the laminate patch 22 being applied to the upper surface as seen in FIG. 6. This is a matter of convenience—normally applying operations are performed from above while one looks at the finished product as seen in FIG. 2.

Above the horizontal path along which the paper web 10 travels is a parent roll 27 of coupon stock type web film which provides the laminate 22. Inasmuch as this stock 27 is conveniently purchased commercially, it is equipped with the pressure sensitive adhesive 21. Overlying the adhesive is a release liner 27a which is continuously removed from the coupon stock emanating from the roll 27. The no longer needed release liner 27 is then rewound into a roll 27b for disposition.

Prior to the unwinding of the release liner 27a and rewinding it into the roll 27b for disposition, the exposed face 24b of the laminate is reverse printed as at 28 in FIG. 5.

The laminate has the pressure-sensitive adhesive 21 facing upwardly and the thickness of the laminate is exaggerated in FIG. 6 for ease of understanding. The web 27 passes over vacuum roll 29 which is rotating with a surface speed faster than the speed of the web 27. Thus, there is a sliding contact between the web 27 and the roll 29. Arranged next to the vacuum roll 29 is cutoff roll 30 which is seen to sever the web and adhesive into the discrete laminate patches 22. These are spaced apart longitudinally by virtue of the faster speed of the vacuum roll 29. The laminate patches 22 are adhered to the web 10 by virtue of the pressure-sensitive adhesive being in face-to-face contact with the web 10.

Thereafter, the web 20 encounters the diecutting station generally designated 31 and which includes an anvil roll 32 and a die roll 33. This provides the diecut after which the forms can be transversely perforated by the perforator generally designated 34 to define the across perforation lines 12.

SUMMARY

The card intermediate of the invention includes a length (11) of paper having top and bottom surfaces (19, 20) and a generally rectangular diecut (15) extending therethrough between those two surfaces to define a card (14), a film laminate 922) is adhesively secured to the bottom surface (20) and extends beyond the diecut (15) on all sides thereof. The laminate includes two film layers (23, 24) adhesively united in superposed relation with a first (23) of the film layers being positioned adjacent the bottom surface (20) and a second (24) of said film layers being positioned remote from the bottom surface (20). The diecut (15) extends through the first film layer but not the second film layer and the paper length top surface (19) within the diecut (15) is equipped with first and second printed indicia (17, 18) within the diecut. A dry adhesive (25) is interposed between the first and second film layers, the dry adhesive being rupturable upon exertion of a removal force on the card (14) whereby the first film layer (23) remains with the card (14) when the card is removed from the paper length (11).

In one embodiment as illustrated, the second film layer (24) is substantially transparent and has upper and lower surfaces (24a, 24b). The upper surface (24a) is adjacent the paper bottom surface (20) and the lower surface (24b) is remote from the paper bottom surface (20) with reverse alpha and/or numeric information printed on the lower surface (24b).

The invention finds particularly advantageous application to I.D. cards where the first printed indicia 17 relates to the sponsor of the I.D. card and the second printed indicia 18 relates to the identity of the intended user of the I.D. card. A suitable user for the inventive I.D. card intermediate is for insurance company use—particularly in states requiring motorists to keep insurance I.D. cards in their vehicles. In such case the indicia 16 can relate to the insurance company, the indicia 17 to the policy, and the indicia 18 to the motorist. The reverse printing or third indicia 26 may be the legend "Be sure to keep . . . ". When the motorist removes the card 14 from the form length 11, the last thing he or she sees before throwing the form length away is the message to keep the card 14 in the vehicle.

The card intermediate can be made advantageous with two diecuts (15) in side-by-side relation to define two I.D. cards—see FIG. 1 and with the laminate extending over an beyond both diecuts. In some cases, the laminate may be continuously longitudinally to cover the cards in adjacent forms. In FIG. 1, for example, the cards 14 are equally longitudinally spaced in adjacent form lengths 11b, 11 and 11a as illustrated. Further, the length of paper can be zig-zag folded as at 35 between longitudinally-spaced diecuts 15. For manufacture and subsequent processing, viz., printing as at 36, the length of paper 20 can be equipped with a series of line holes 13a along at least one side 13. Normally, the string 10 of connected form lengths 11 is produced by a forms manufacturer and printed with the generalized or "fixed" indicia 16 and 26. Further a portion of the variable indicia 17, 18 may also be fixed and printed on the web 10 prior to processing as seen in FIG. 6. However, the variable indicia 17, 18 is normally applied by the issuer or distributor of the cards 14, viz., the insurance company in responding to the payment of a premium.

The inventive method includes the steps of providing the web 10 and the web 27—either as shown or with one surface carrying the adhesive 21 and the other the reverse printed indicia 26. Thereafter, there is an adhesive uniting of the laminate 22 to the other 20 of the surfaces to position a first 23 of the film plies adjacent other surface 20, and diecutting as at 15 the paper length and the first 23 of the film plies to provide a generally rectangular closed perimeter cut for the card 14. Thereafter, there is imprinting of the printed indicia on the surface 19 relating to the identity of the intended user of the I.D. card.

The steps up to and including the die cutting 15 are performed at a first site and the user identity imprinting step 36 is provided at a second site. Advantageously, the paper length is provided with a plurality of I.D. cards arranged in longitudinally spaced relation at the first site and the user identity imprinting step 36 is provided at a second site. Advantageously, the paper length is provided with a plurality of I.D. cards arranged in longitudinally spaced relation at the fist site and thereafter transported to the second site 35' where there is laser printing of the user indicia.

While in the foregoing specification a detailed description of an embodiment of the invention has been set down for the purpose of illustration, many variations in the details hereingiven may be made by those skilled in the art without departing from the spirit and scope of the invention.

I claim:

1. A card intermediate comprising a length of paper having top and bottom surfaces and a generally rectangular diecut extending therethrough between said surfaces to define a card, a film laminate adhesively secured to said bottom surface and extending beyond the diecut on all sides thereof, said laminate including two film layers adhesively untied in superposed relation with a first of said film layers being positioned adjacent said bottom surface and a second of said film layers being positioned remote from said bottom surface, said diecut extending through said first film layer but not said second film layer, said second film layer being substantially transparent and having upper and lower surfaces, said upper surface being adjacent said paper bottom surface and said lower surface being remote from said paper bottom surface, and reverse alpha and/or numeric information printed on said surface.

2. A card intermediate comprising a length of paper having top and bottom surfaces and a generally rectangular diecut extending therethrough between said surfaces to define a card, a film laminate adhesively secured to said bottom surface and extending beyond the diecut on all sides thereof, said laminate including two film layers adhesively united in superposed relation with a first of said film layers being positioned adjacent said bottom surface and a second of said film layers being positioned remote from said bottom surface, said diecut extending through said first film layer but not said second film layer, a dry adhesive being interposed between said first and second film layers, said dry adhesive being rupturable upon exertion of a removal force on said card whereby said first film layer remains with said card when said card is removed form said paper length, said second film layer being substantially transparent and having upper and lower surfaces, said upper surface being adjacent said paper bottom surface and said lower surface being remove from said paper bottom surface, and reverse alpha and/or numeric information printed on said lower surface.

3. An I.D. card intermediate comprising a length of paper having top and bottom surfaces and a generally rectangular diecut extending therethrough between said surfaces to define an I.D. card, a film laminate adhesively secured to said bottom surface and extending beyond the diecut on all sides thereof, said laminate including two film layers adhesively united in superposed relation with a first of said film layers being positioned adjacent said bottom surface and a second of said film layers being positioned remote from said bottom surface, said diecut extending through said first film layer but not said second film layer, said paper length top surface within said diecut being equipped with first and second printed indicia within said diecut said first printed indicia relating to the sponsor of said I.D. card and said first printed indicia relating to the sponsor of said I.D. card and said second printed indicia relating to the identity of the intended user of said I.D. cards, said second film layer being substantially transparent and having upper and lower surfaces, said upper surface being adjacent said paper bottom surface and reverse alpha and/or numeric information printed on said lower surface.

4. An I.D. card intermediate comprising a length of paper having top and bottom surfaces and a generally rectangular diecut extending therethrough between said surfaces to define an I.D. card, a film laminate adhesively secured to said bottom surface and extending beyond the diecut on all sides thereof, said laminate including two film layers adhesively united in superposed relation with a first of said film layers being positioned adjacent said bottom surface and a second of said film layers being positioned remote from said bottom surface, said diecut extending through said first film layer but not said second film layer, said paper length top surface within said diecut being equipped with first and second printed indicia within said diecut said first printed indicia relating to the sponsor of said I.D. card and said second printed indicia relating to the identity of the intended user of said I.D. card, a dry adhesive being interposed between said first and second film layers, said dry adhesive being rupturable upon exertion of a removal force on said I.D. card whereby said first film layer remains with said I.D. card when said I.D. card is removed from said paper length, said second film layer being substantially transparent and having upper and lower surfaces, said upper surface being adjacent said paper bottom surface and said lower surface being remote from said paper bottom surface, and reverse alpha and/or numeric information printed on said lower surface.

* * * * *